(12) United States Patent
Zhang

(10) Patent No.: US 10,791,397 B2
(45) Date of Patent: Sep. 29, 2020

(54) LOCATING METHOD, LOCATING SYSTEM, AND TERMINAL DEVICE

(71) Applicant: Tencent Technology (Shenzhen) Company Limited, Shenzhen (CN)

(72) Inventor: Mingyuan Zhang, Shenzhen (CN)

(73) Assignee: TENCENT TECHNOLOGY (SHENZHEN) COMPANY LIMITED, Shenzhen, Guangdong Province (CN)

(*) Notice: Subject to any disclaimer, the term of this patent is extended or adjusted under 35 U.S.C. 154(b) by 141 days.

(21) Appl. No.: 16/203,345

(22) Filed: Nov. 28, 2018

(65) Prior Publication Data
US 2019/0098402 A1    Mar. 28, 2019

Related U.S. Application Data

(63) Continuation-in-part of application No. PCT/CN2017/092566, filed on Jul. 12, 2017.

(30) Foreign Application Priority Data

Jul. 22, 2016    (CN) .......................... 2016 1 0586849

(51) Int. Cl.
*G10L 21/0216*    (2013.01)
*H04R 3/00*    (2006.01)
(Continued)

(52) U.S. Cl.
CPC ............ H04R 3/005 (2013.01); *G01S 5/20* (2013.01); *G01S 17/08* (2013.01); *G01S 17/42* (2013.01);
(Continued)

(58) Field of Classification Search
CPC ....................................... H04R 3/005
See application file for complete search history.

(56) References Cited

U.S. PATENT DOCUMENTS

2009/0323981 A1* 12/2009 Cutler .................. H04N 7/142
                                                              381/92
2010/0008516 A1* 1/2010 Ichikawa ................. G01S 5/30
                                                              381/92
(Continued)

FOREIGN PATENT DOCUMENTS

CN    101504546 A    8/2009
CN    104376847 A    2/2015
(Continued)

OTHER PUBLICATIONS

Tencent Technology, ISRWO, PCT/CN2017/092566, dated Sep. 6, 2017, 7 pgs.

(Continued)

*Primary Examiner* — Douglas Godbold
(74) *Attorney, Agent, or Firm* — Morgan, Lewis & Bockius LLP

(57) ABSTRACT

A device monitors, by using a microphone array, a sound generated by a monitoring target. In response to detecting a sound signal by the microphone array, the device determines a sound source direction corresponding to detected sound signal according to a sound phase difference obtained by each microphone in the microphone array. The device performs infrared detection in the sound source direction by using the infrared transceiver. The device determines a distance between the monitoring target and the infrared transceiver in the sound source direction according to an infrared detection result obtained by the infrared transceiver. The device generates location information of the monitoring target according to the sound source direction and the distance.

20 Claims, 5 Drawing Sheets

(51) Int. Cl.
   *G01S 17/42*  (2006.01)
   *H04R 1/40*   (2006.01)
   *G01S 5/20*   (2006.01)
   *G06F 40/30*  (2020.01)
   *G01S 17/08*  (2006.01)
   *H04R 5/027*  (2006.01)
   *H04R 5/04*   (2006.01)

(52) U.S. Cl.
   CPC .......... *G06F 40/30* (2020.01); *G10L 21/0216* (2013.01); *H04R 1/406* (2013.01); *H04R 5/027* (2013.01); *H04R 5/04* (2013.01); *H04R 2420/07* (2013.01)

(56) References Cited

U.S. PATENT DOCUMENTS

| | | | | |
|---|---|---|---|---|
| 2011/0298918 A1* | 12/2011 | McEldowney | ...... | G02B 27/286 348/136 |
| 2011/0306397 A1* | 12/2011 | Fleming | ................ | A63F 13/213 463/7 |
| 2012/0224456 A1* | 9/2012 | Visser | ................... | G01S 15/876 367/127 |
| 2014/0136981 A1* | 5/2014 | Xiang | ............... | H04R 3/005 715/728 |
| 2014/0219472 A1* | 8/2014 | Huang | .................. | H04R 5/027 381/92 |
| 2014/0349760 A1* | 11/2014 | Tarama | ................. | A63F 13/814 463/34 |
| 2015/0237455 A1* | 8/2015 | Mitra | ..................... | H04N 7/183 381/92 |
| 2015/0302867 A1* | 10/2015 | Tomlin | ................... | G10L 25/78 704/270 |
| 2015/0325270 A1* | 11/2015 | Utsunomiya | ...... | G06K 9/00355 386/230 |
| 2016/0173293 A1* | 6/2016 | Kennedy | ............ | H04L 12/2814 709/222 |
| 2016/0323565 A1* | 11/2016 | van Baarsen | ........ | H04N 13/271 |
| 2017/0188138 A1* | 6/2017 | Makinen | ............... | H04R 3/005 |
| 2017/0344832 A1* | 11/2017 | Leung | ............... | G06K 9/00342 |
| 2018/0310097 A1* | 10/2018 | Takahashi | .............. | H04N 7/147 |
| 2019/0173446 A1* | 6/2019 | Knode | ................. | H04R 29/001 |

FOREIGN PATENT DOCUMENTS

| | | |
|---|---|---|
| CN | 105657253 A | 6/2016 |
| JP | H 05168100 A | 7/1993 |

OTHER PUBLICATIONS

Tencent Technology, IPRP, PCT/CN2017/092566, dated Jan 22, 2019, 5 pgs.

* cited by examiner

LOCATING METHOD, LOCATING SYSTEM, AND TERMINAL DEVICE

PRIORITY CLAIMS AND RELATED APPLICATIONS

This application is a continuation-in-part application of PCT application number: PCT/CN2017/092566, entitled "LOCATING METHOD, LOCATING SYSTEM, AND TERMINAL DEVICE", filed on Jul. 12, 2017, which claims priority to Chinese Patent Application No. 201610586849.0, filed with the Chinese Patent Office on Jul. 22, 2016 and entitled "LOCATING METHOD, LOCATING SYSTEM, AND TERMINAL DEVICE", all of which are incorporated herein by reference in their entirety.

FIELD OF THE TECHNOLOGY

This application relates to the field of signal processing, and in particular, to a locating method, a locating system, and a terminal device.

BACKGROUND OF THE DISCLOSURE

With development of a voice technology, intelligent robots have also been developing very quickly in recent years, and multiple branches are formed, for example, an intelligent home robot and an outdoor search and rescue robot. Identifying and locating a human presence is one of key technologies of various robot products, and currently is mainly implemented with reference to an analysis of an infrared pyroelectric signal and/or a sound signal.

However, in an actual use scenario, various unexpected situations often occur. For example, a human's body may be blocked by various obstacles, and consequently a thermal infrared sensor cannot accurately capture an infrared pyroelectric signal sent by the human body. In addition, collected sound signals are concentrated mainly in a frequency band of 300 to 3400 Hz, and an analysis is performed according to sound intensity of this frequency band, to determine whether a living organism within a human voice frequency band exists around a search and rescue robot. Consequently, a collection manner is simplex and an anti-interference capability is low.

To sum up, a current signal collection and analysis manner not only has a low accuracy of locating and consumes a long time, but also cannot deal with physical obstacles and audio interference.

SUMMARY

In view of this, an objective of this application is to provide a locating method, a locating system, and a terminal device, to resolve technical problems in the existing technology, for example, low accuracy and incapability of dealing with an obstacle. In particular, time division polling on both sound signals and infrared signals are utilized, such that in a varied environment, either a sound or a presence of the body heat can trigger the detection of the human presence, and more accurate methods of locating the target. In addition, the detection of the sound signal during the polling stage can be wideband, and no need to focus on just a small narrow band for human voice, increasing the possibility of detecting target that is not speaking or cannot speaking at the time of detection of the sound signal. The audio signal detection can be used to capture trigger sound in a wider angular range and directions than the infrared detection method, and when integrated with the infrared detection methods, the detection probability is increased, the chance of missing a target is reduced, and location accuracy is increased, and the detection scenarios are more versatile.

In one aspect, a method is performed at a device having one or more processors and memory. The device is configured to control a location unit. The location unit includes a microphone array including at least three microphones located at different positions in the microphone array, an infrared sensing array including at least three infrared sensors located at different positions in the infrared sensing array, and an infrared transceiver configured to emit an infrared signal and receive a reflected infrared signal. The device monitors, by using the microphone array, a sound generated by a monitoring target. In response to detecting a sound signal by the microphone array, the device determines a sound source direction corresponding to detected sound signal according to a sound phase difference obtained by each microphone in the microphone array. The device performs infrared detection in the sound source direction by using the infrared transceiver. The device determines a distance between the monitoring target and the infrared transceiver in the sound source direction according to an infrared detection result obtained by the infrared transceiver. The device generates location information of the monitoring target according to the sound source direction and the distance.

According to a second aspect of the present disclosure, a computing device includes one or more processors, memory, a display, a touch-sensitive surface, and a plurality of instructions stored in the memory that, when executed by the one or more processors, cause the computing device to perform the aforementioned method.

According to a third aspect of the present disclosure, a non-transitory computer readable storage medium storing a plurality of instructions configured for execution by a computing device having one or more processors, the plurality of instructions causing the computing device to perform the aforementioned method.

Details of one or more embodiments of the present disclosure are provided in the following accompanying drawings and descriptions. Other features, objectives, and advantages of the present disclosure become clear in the specification, the accompanying drawings, and the claims.

BRIEF DESCRIPTION OF THE DRAWINGS

To describe the technical solutions of the embodiments of this application more clearly, the following briefly introduces the accompanying drawings required for describing the embodiments. Apparently, the accompanying drawings in the following description show only some embodiments of this application, and a person of ordinary skill in the art may still derive other drawings from these accompanying drawings without creative efforts.

DESCRIPTION OF EMBODIMENTS

Referring to the figures in the accompanying drawings, same components are represented by same component symbols. The principle of this application is illustrated by an application in a suitable computing environment. The following description is based on the illustrated specific embodiment of this application, which should not be construed as limiting other specific embodiments of this application that are not discussed in detail herein.

While the principle of this application is being described in the foregoing text, it is not meant to be limiting as a person skilled in the art will appreciate that the various steps and operations described hereinafter may alternatively be implemented in hardware. The principle of this application is operational with numerous other general purpose or special purpose computing or communications environments or configurations.

Figure 1:
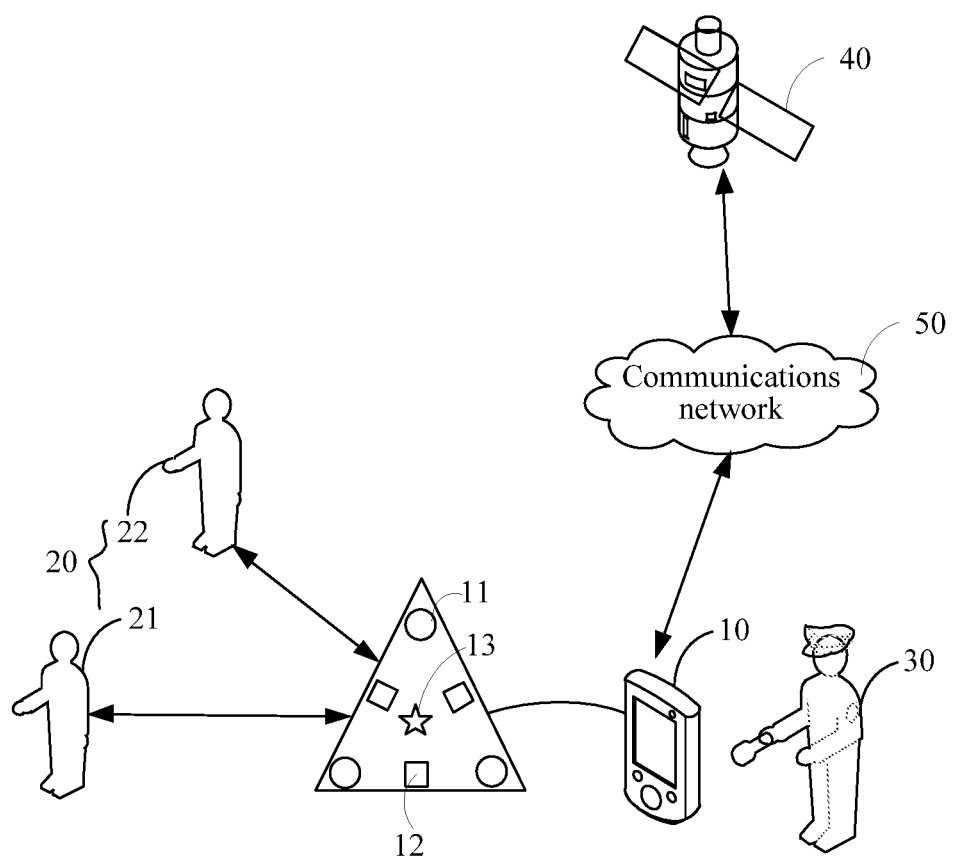
FIG. 1 is a schematic diagram of an application environment of a locating method and a locating system according to an embodiment of this application.

Referring to FIG. 1, FIG. 1 is a schematic diagram of an application environment of a locating method and a locating system according to this application. The application environment includes a terminal device 10, a monitoring target 20, a global locating system (GPS) 40, and a communications network 50.

The terminal device 10 is configured to perform the locating method provided in this application or run the locating system. A microphone array 11, a thermal infrared sensing array 12, and an infrared transceiver 13 are disposed on the terminal device 10. In some embodiments, the terminal device 10 is a mobile robot that executes planed movement paths or executes random walk before detecting a target. In some embodiments, the terminal device 10 includes two separate component, a first component that runs the control unit and is a mobile phone or tablet device with a display and configured to receive control inputs from a user, and a second component that includes movement unit including wheels or other movement mechanisms, and the detection unit including the microphone array 11, the thermal infrared sensing array 12, and the infrared transceiver 13. The first component controls the second component. In some embodiments, the first and second components are integrated and move together as a unit. The terminal device 10 is configured to: perform polling monitoring by using the microphone array 11 and/or the thermal infrared sensing array 12, to generate a sound source direction of the monitoring target 20, perform infrared detection on the sound source direction by using the infrared transceiver 13, to generate a distance between the two, and generate location information of the monitoring target 20 according to the direction and the distance.

It may be understood that an infrared module includes two parts. One part is the thermal infrared sensing array 12 that includes a passive infrared pyroelectric sensor and that is configured to receive an infrared pyroelectric signal emitted by the monitoring target 20; the other part is an active infrared transceiver, configured to: emit infrared light, receive infrared light reflected by the monitoring target 20, and obtain accurate distance between the terminal device 10 and the monitoring target 20 by calculating a time.

The monitoring target 20 includes but is not limited to a human being, or may be another specified species, for example, a species that can produce a sound and an infrared pyroelectric signal, such as a dog or a mouse. Using the human being as an example, the terminal device 10 performs parameter extraction according to a voice characteristic and an infrared characteristic of the human being, and performs parameter setting for components such as the microphone array 11, the thermal infrared sensing array 12, and the infrared transceiver 13, to increase accuracy of identifying and locating.

Application scenarios in this application are mainly divided into two types according to a relationship between the monitoring target 20 and a user 30:

First type: the user 30 is a monitoring target 21, and the monitoring target 21 actively sends a wake-up keyword, to drive the terminal device 10 to perform a locating operation; for example, the monitoring target 20 calls "Little Q" or "Machine T" to drive the terminal device 10 to perform locating; this type is especially applicable to a scenario such as an intelligent home. For example, when the user utters the wake-up keyword, and the terminal device 10 detects the presence of the user, the terminal device will turn to the user (e.g., turn around by a suitable amount and/or tilt head upward or downward by a suitable amount, etc.) and/or move toward or away from the user (e.g., adjust the distance to the user to a preset suitable distance).

Second type: the user 30 and the monitoring target 22 independently exist, that is, the monitoring target 22 emits any sound signal and infrared pyroelectric signal, to drive the terminal device 10 to lead the user 30 to perform a locating operation; this type is especially applicable to a search and rescue scenario.

In the second application scenario, the terminal device 10 first generates location information of the monitoring target 20, that is, information about a relative location between the terminal device 10 and the monitoring target 20, then obtains longitude and latitude information of the terminal device 10 by using the GPS system 40, and publishes longitude and latitude information of the monitoring target 20, that is, an absolute location of the monitoring target 20, after combining the two.

The communications network 50 includes a wireless network and a wired network. The wireless network includes one of or a combination of multiple of a wireless wide area network, a wireless local area network, a wireless metropolitan area network, or a wireless personal network. The wireless network is particularly used for signal transmission between the terminal device 10 and the GPS system 40.

This solution may be applied to an intelligent device that is based on a search and rescue device or another intelligent device that can be driven by a voice. Referring to the following embodiments, the embodiments shown in FIG. 2 and FIG. 3 focus on the locating method, the embodiment shown in FIG. 4 focuses on the locating system, the embodiment shown in FIG. 5 focuses on a hardware environment of the locating method and the locating system.

Figure 2:
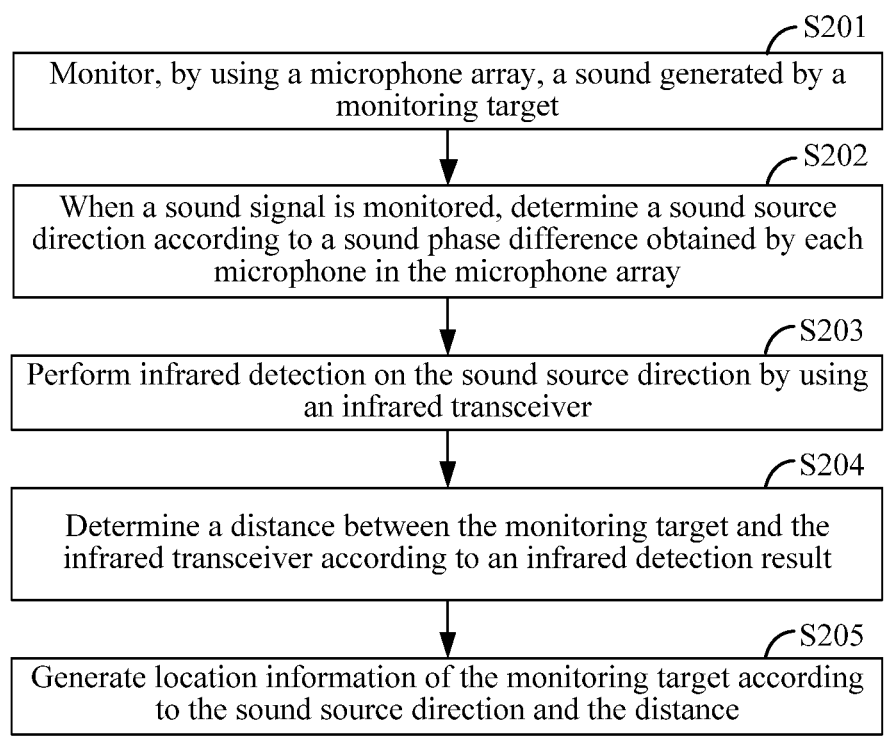
FIG. 2 is a basic schematic flowchart of a locating method according to an embodiment of this application.
Figure 3:
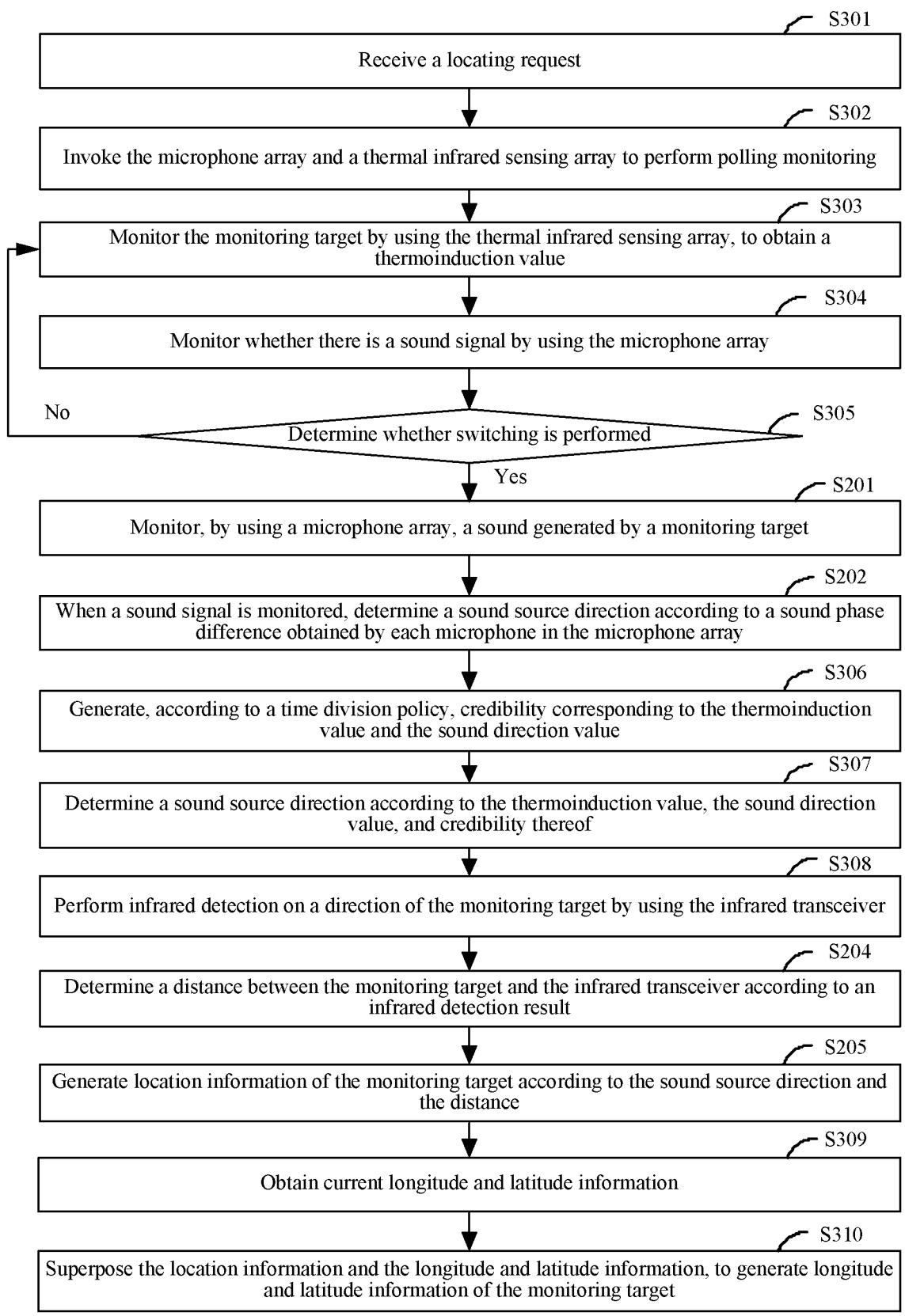
FIG. 3 is an optimized schematic flowchart of a locating method according to an embodiment of this application.

Referring to FIG. 2 and FIG. 3, FIG. 2 and FIG. 3 are schematic flowcharts of the locating method. The locating method is generally performed on a terminal device, for example, a mobile phone, a computer, a search and rescue device, or an intelligent home device. Enumeration is not performed one by one herein.

As shown in FIG. 2, the locating method mainly includes:

Step S201: Monitor, by using a microphone array, a sound generated by a monitoring target.

The microphone array includes at least three microphones, to determine a unique direction. In this embodiment, for the convenience of calculation, the multiple microphones in the microphone array are generally distributed evenly. For example, three microphones are evenly distributed in three corners of the microphone array, and a line connecting the three microphones may be an equilateral triangle; four microphones are evenly distributed in four corners of the microphone array, and a line connecting the four microphones may be a square or a rhombus. In some embodiments, a first set of microphones are used to detect sounds in a first frequency range, and a second set of microphones are used to detect sounds in a second frequency range (e.g., non-voice frequency range, such as range for dogs, or movements, etc.) that is different from the first frequency range (e.g., voice frequency). Each microphone location of the microphone array optionally includes a respective one microphone from each of the sets of microphones corresponding to the different frequency ranges.

Step S202: When a sound signal is monitored (e.g., detected by one or more of the microphones in the microphone array), determine a sound source direction according to a sound phase difference obtained by each microphone in the microphone array. In some embodiments, based on the frequency range of the detected sound signal, the terminal device also determines whether the sound is a voice sound or a non-voice sound. In some embodiments, only when the sound signal is a voice sound, will the terminal device proceed to trigger the infrared system to locate the source of the sound.

Specifically, this step includes:

Step S2021: Simultaneously perform sound monitoring on each microphone, and obtain a sound intensity value and/or a sound phase value.

Step S2022: Perform difference calculation by substituting the sound intensity value and/or sound phase value of each sound into a locating function, to obtain a sound direction value according to a calculation result.

It may be understood that, two possible direction points may be determined by using intensity values and/or phase values generated by any two microphones; the two direction points are axially symmetric by using a straight line on which the two microphones are located as the axis; in addition, an intensity value and/or a phase value generated by one microphone is added to exclude the two possible direction points, to generate a unique sound direction.

Step S203: Perform infrared detection on the sound source direction by using an infrared transceiver.

Step S204: Determine a distance between the monitoring target and the infrared transceiver according to an infrared detection result.

Specifically, this step includes:

Step S2041: Calculate a difference between an infrared transmitting time and an infrared receiving time, to generate an infrared detection result.

Step S2042: Determine a horizontal distance, a height difference, and/or a pitch angle between the monitoring target and the infrared transceiver according to the infrared detection result.

For example, the infrared transceiver performs infrared detection on an area range of the sound source direction, to generate multiple groups of infrared detection results, and determines an outline of the monitoring target according to the groups of infrared detection results. A relative distance between each edge of the outline of the monitoring target and the infrared transceiver is compared. For example, if the monitoring target is a person standing on the level ground, the relative distance may be represented as: a horizontal distance is 5 meters, and a height is 0 meters to 1.7 meters; if the monitoring target is a person lying on a bed, the relative distance may be represented as: a horizontal distance is 2 meters, and a height is 0.4 meter to 0.6 meter.

Step S205: Generate location information of the monitoring target according to the sound source direction and the distance.

It may be understood that, in this step, the location information of the monitoring target refers to a relative location between the monitoring target and the terminal device. For example, a voice prompt is: the monitoring target is 20 meters to the front left of the terminal device, the monitoring target is 45 meters from the terminal device at an 11 o'clock direction, and so on. For another example, a video prompt is: a relative location relationship between the two is displayed in a map navigation manner, and a dynamic variation prompt for a route is provided as the two move closer or farther from each other.

According to the locating method of this application, the monitoring target is identified and located by means of multi-directional collection and a precise analysis of a sound signal and an infrared pyroelectric signal.

As shown in FIG. 3, the locating method is optimized based on FIG. 2, and an original sequence number is kept for a same step. The locating method includes:

Step S301: Receive a locating request.

Step S302: Invoke the microphone array and a thermal infrared sensing array according to the locating request, to perform polling monitoring on the monitoring target.

It may be understood that, before this step is performed, the method further includes:

Step S3021: Set a polling module, that is, the microphone array and the thermal infrared sensing array.

A setting rule for a thermal infrared sensor in the thermal infrared sensing array is the same as that for the microphone array, and the two may be set in a cross manner, and combined to form a detecting head component.

Step S3022: Set a time division policy of polling. For example, a time division ratio between the microphone array and the thermal infrared sensing array is 1:2, that is, the microphone array invokes one time interval T, and the thermal infrared sensing array invokes two time intervals 2T.

Step S303: Monitor, by using the thermal infrared sensing array, an infrared pyroelectric signal sent by the monitoring target, to obtain a thermal sensing value.

The thermal infrared sensing array includes at least three thermal infrared receivers, to determine a unique direction.

Step S304: Monitor whether there is a sound signal by using the microphone array.

If the sound signal is not obtained, the thermal sensing value is discarded; or if the sound signal is obtained, the thermal sensing value and monitoring duration thereof are stored.

Step S305: Determine, according to the time division policy of the polling, whether switching is performed.

If the switching is performed, step S201 is performed; or if the switching is not performed, step S303 or step S304 continues to be performed.

It may be understood that, steps S303 and S304 and steps S201 and S202 are not performed in a fixed sequence, and may be performed in a different order. That is, alternatively the determining in step S305 may be performed after step S202, and step S306 may be performed after a polling period is preset.

Step S201: Monitor, by using a microphone array, a sound generated by a monitoring target.

The microphone array includes at least three microphones, to determine a unique direction.

Step S202: When a sound signal is monitored, obtain a sound direction value according to a sound phase difference obtained by each microphone in the microphone array.

Specifically, this step includes:

Step S2021: Simultaneously perform sound monitoring on each microphone, and obtain a sound intensity value and/or a sound phase value.

Step S2022: Perform a voice or semantic analysis on the sound signal.

Step S2023: Determine whether a result of the analysis includes a preset wake-up keyword, such as Little Q, X Device, or Help.

Step S2024: When the wake-up keyword is included, perform difference calculation by substituting the sound intensity value and/or sound phase value of each sound into a locating function, to obtain a sound direction value according to a calculation result.

Step S306: Generate, according to the rules of the time division policy of the polling, credibility corresponding to the thermal sensing value and the sound direction value, wherein a sum of the credibility is 1.

It may be understood that, credibility of the thermal sensing value and the sound direction value is a weight value that may dynamically change. A longer time of polling corresponding to a module indicates higher credibility thereof. Using an example in which the time division ration is 1:2, the credibility of the sound direction value is ⅓, and the credibility of the thermal sensing value is ⅔.

Step S307: Generate a sound source direction according to the thermal sensing value, the sound direction value, and the credibility thereof.

That is, weighting calculation is performed on the collected sound signal and infrared pyroelectric signal by using a VAT time division scanning weighting algorithm, to generate a more accurate direction.

Step S308: Perform infrared detection on a direction of the monitoring target by using the infrared transceiver.

Step S204: Determine a distance between the monitoring target and the infrared transceiver according to an infrared detection result.

Specifically, this step includes:

Step S2041: Calculate a difference between an infrared transmitting time stamp and an infrared receiving time stamp, to generate an infrared detection result.

Step S2042: Determine a horizontal distance, a height difference, and/or a pitch angle between the monitoring target and the infrared transceiver according to the infrared detection result.

For example, the relative distance between the monitoring target and the infrared transceiver is: the horizontal distance is 5 meters, and the height is 0.3 meter to 0.7 meter.

Step S205: Generate location information of the monitoring target according to the sound source direction and the distance.

It may be understood that, in this step, the location information of the monitoring target refers to the relative location between the monitoring target and the terminal device. For example, a voice prompt is: the monitoring target is 20 meters to the front left of the terminal device, the monitoring target is 45 meters from the terminal device at an 11 o'clock direction, and so on; a video prompt is: a relative location relationship between the two is displayed in a map navigation manner, and a dynamic variation prompt for a route is provided as the two move closer or farther from each other.

Step S309: Obtain current longitude and latitude information.

Step S310: Superpose the location information and the longitude and latitude information, to generate longitude and latitude information of the monitoring target.

For example, when the terminal device is located at longitude XX degrees east and latitude XX degrees north, panning is performed by using the relative location between the terminal device and the monitoring target, to generate the longitude and latitude information of the monitoring target.

It may be understood that, in this step, an absolute location of the monitoring target may be generated, and the absolute location may be published to another terminal device to perform search and rescue.

According to the locating method of this application, polling monitoring is performed by using a microphone array and/or a thermal infrared sensing array, to generate a direction of a monitoring target, infrared detection is performed on the direction by using an infrared transceiver, to generate a distance between the two, and location information of the monitoring target is generated according to the direction and the distance, thereby not only implementing multi-directional collection and a precise analysis of a sound signal and an infrared pyroelectric signal, but also identifying, locating and confirming the monitoring target by using a time division scanning weighting algorithm.

Based on the above, in some embodiments, a method is performed at a device having one or more processors and memory. The device is configured to control a location unit. The location unit includes a microphone array including at least three microphones located at different positions in the microphone array, an infrared sensing array including at least three infrared sensors located at different positions in the infrared sensing array, and an infrared transceiver configured to emit an infrared signal and receive a reflected infrared signal. The device monitors, by using the microphone array, a sound generated by a monitoring target. In response to detecting a sound signal by the microphone array, the device determines a sound source direction corresponding to detected sound signal according to a sound phase difference obtained by each microphone in the microphone array. The device performs infrared detection in the sound source direction by using the infrared transceiver. The device determines a distance between the monitoring target and the infrared transceiver in the sound source direction according to an infrared detection result obtained by the infrared transceiver. The device generates location information of the monitoring target according to the sound source direction and the distance.

In some embodiments, before performing the monitoring, by using the microphone array, a sound generated by a monitoring target, the device receives a locating request. In response to receiving the locating request, the device invokes the microphone array and the thermal infrared sensing array according to a time division polling policy to alternately monitor the monitoring target using only one of the microphone array and the thermal infrared sensing array at a time. Invoking the microphone array and the thermal sensing array include: monitoring an infrared pyroelectric signal of the monitoring target by using the thermal infrared sensing array; and in accordance with a determination that an infrared pyroelectric signal is detected by the thermal infrared sensing array, invoking the microphone array to monitor a sound generated by a monitoring target; and in accordance with a determination that an infrared pyroelectric signal is not detected within a time period set for the infrared sensing array in the time division polling policy, and that the time period set for the infrared sensing array has expired, invoking the microphone array to monitor a sound generated by a monitoring target. In other words, the other type of sensing mechanisms are invoked when a signal is detected on the currently used sensing mechanism, otherwise, the switch between the sensing mechanisms occurs at the end of the preset time period allotted to the current sensing mechanism in the time division polling policy. This way, both types of sensing mechanisms are utilized expanding the detection capability of the device in varied scenarios, and the switching occurs early when one type of sensing mechanism is used to detect one type of signal, and it is beneficial to quickly detect a companion signal of a different type to enhance the corroboration of the two types of signals, improving location accuracy and effect while saving time.

In some embodiments, the device detects, by using the thermal infrared sensing array, an infrared sensing value of an infrared pyroelectric signal emitted by the monitoring target. The device calculates a sound intensity difference and/or a sound phase difference received by each microphone in the microphone array, to obtain a sound direction value corresponding to the monitoring target. The device separately obtains credibility values corresponding to the thermal sensing value and the sound direction value according to the time division polling policy, wherein a sum of the credibility values is constrained to be unity. The device determines the sound source direction according to the thermal sensing value, the sound direction value, and the corresponding credibility values thereof.

In some embodiments, calculating a sound intensity difference and/or a sound phase difference received by each microphone in the microphone array, to obtain a sound direction value corresponding to the monitoring target includes: simultaneously performing sound monitoring on each microphone of the microphone array to obtaining a respective sound intensity value and/or a respective sound phase value for the microphone; and performing difference calculation by substituting the sound intensity value and/or sound phase value of each sound into a triangulation locating function, to obtain the sound direction value according to a calculation result.

In some embodiments, in accordance with a determination that a sound signal is detected by the microphone array, the device performs a voice or semantic analysis on the sound signal. The device determines, according to an analysis result of the voice or semantic analysis, whether a wake-up keyword is included in the sound signal, wherein determination of the sound source direction corresponding to the detected sound signal according to the sound phase difference obtained by each microphone in the microphone array is performed in accordance with a determination that a wake-up keyword is included in the sound signal.

In some embodiments, the determining a distance between the monitoring target and the infrared transceiver in the sound source direction according to the infrared detection result include: calculating a difference between an infrared transmitting time stamp and a corresponding infrared receiving time stamp, to generate the infrared detection result; and determining a horizontal distance, a height difference, and/or a pitch angle between the monitoring target and the infrared transceiver according to the infrared detection result.

In some embodiments, the device moves the location unit (e.g., toward or away from the monitoring target by turning or tilting or laterally move) in accordance with a comparison between a preset distance and the distance between the monitoring target and the infrared transceiver in the sound source direction. By moving the location unit, the location unit can be better positioned to further detect or track the monitoring target subsequently.

Other details of the method are described with various embodiments of the present disclosure, and are not repeated here in the interest of brevity.

Figure 4:
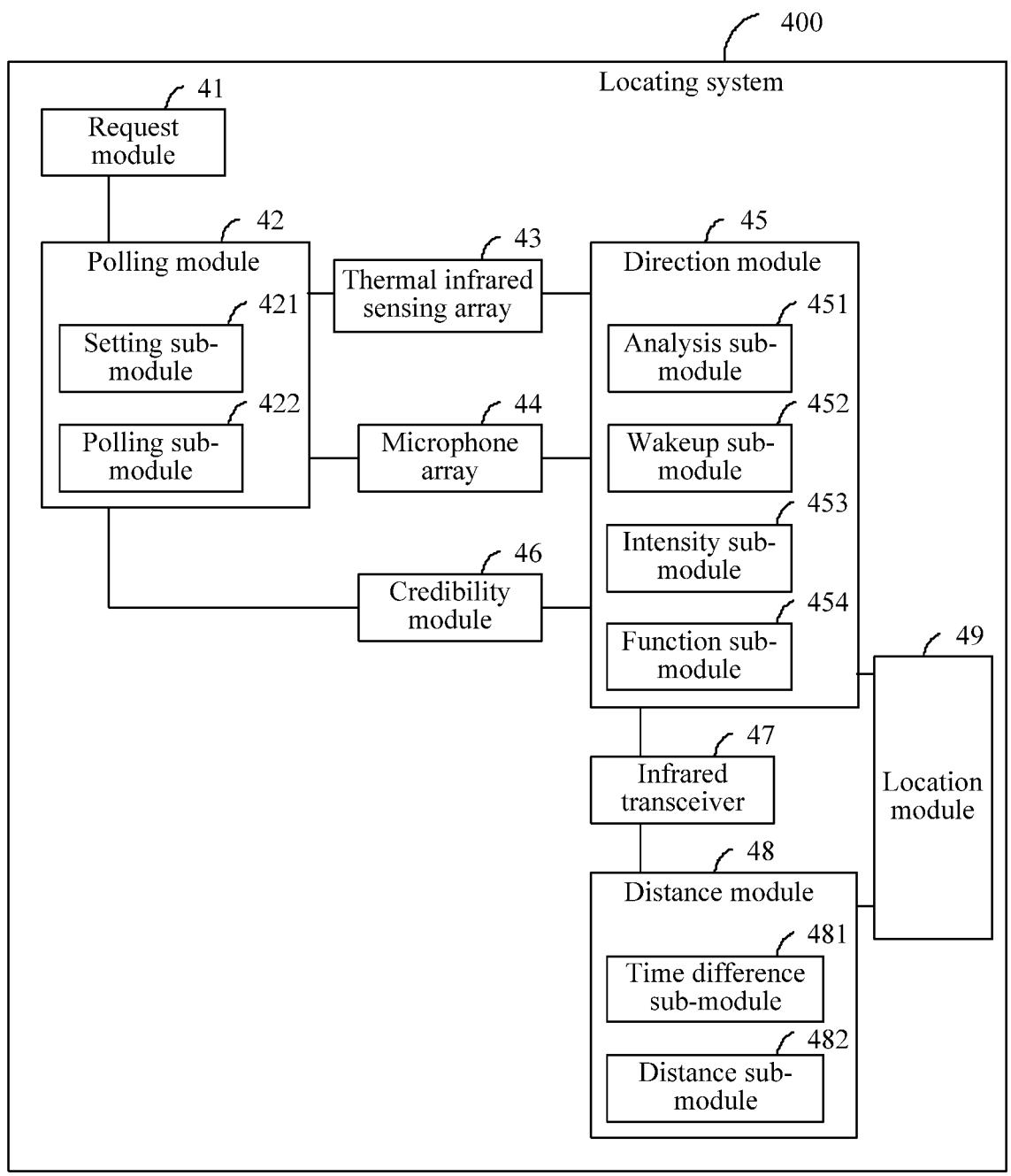
FIG. 4 is a schematic diagram of modules of a locating system according to an embodiment of this application.

Referring to FIG. 4, FIG. 4 is a schematic diagram of modules of a locating system according to an embodiment of this application. The shown locating system is mainly applied to a terminal device, and the terminal device includes but is not limited to a mobile phone, a computer, a search and rescue device, an intelligent home device, or the like. Enumeration is not performed one by one herein.

As shown in FIG. 4, the locating system 400 includes: a request module 41, a polling module 42, a thermal infrared sensing array 43, a microphone array 44, a direction module 45, a credibility module 46, an infrared transceiver 47, a distance module 48, and a location module 49.

The request module 41 is configured to receive a locating request.

It may be understood that, the locating request may be a trigger key or set to a request state.

The polling module 42 is connected to the request module 41, and configured to invoke the microphone array 44 and the thermal infrared sensing array 43 according to the locating request, to perform polling monitoring on the monitoring target.

Specifically, the polling module 42 includes:

a setting sub-module 421, configured to set a polling module, that is, a microphone array and a thermal infrared sensing array; and set a time division policy of polling; for example, a time division ration between the microphone array and the thermal infrared sensing array is 1:2, that is, the microphone array invokes one time interval T, and the thermal infrared sensing array invokes two time intervals 2T; and a polling sub-module 422, configured to: after receiving the locating request, invoke the microphone array and the thermal infrared sensing array according to the time division policy of the polling, to perform polling monitoring on the monitoring target.

The thermal infrared sensing array 43 is connected to the polling module 42, and configured to monitor the infrared pyroelectric signal sent by the monitoring target, to obtain a thermal sensing value.

The thermal infrared sensing array 43 includes at least three thermal infrared receivers. A function of the thermal sensing value is similar to a principle of a direction value determined by a sound.

The microphone array 44 is connected to the thermal infrared sensing array 43, and configured to monitor a sound generated by the monitoring target.

The microphone array 44 includes at least three microphones, to determine a unique direction. In this embodiment, for the convenience of calculation, the multiple microphones in the microphone array are generally distributed evenly. For example, three microphones are evenly distributed in three corners of the microphone array, and a line connecting the three microphones may be an equilateral triangle; four microphones are evenly distributed in four corners of the microphone array, and a line connecting the four microphones may be a square or a rhombus.

The direction module 45 is connected to the microphone array 44, and configured to: when the sound signal is monitored, calculate a sound intensity difference and/or a sound phase difference between each microphone, to determine a sound source direction, and obtain a direction value.

The direction module 45 includes:

an analysis sub-module 451, configured to perform a voice or semantic analysis on a sound after the sound is monitored by the microphone array 44;

a wake-up sub-module 452, configured to determine, according to a result of the analysis, whether a wake-up keyword is comprised;

an intensity sub-module 453, configured to: when the wake-up keyword is comprised, obtain a sound monitoring result of each microphone, to generate a sound intensity value and/or a sound phase value; and a function sub-module 454, configured to perform function calculation on an intensity value and a phase value of each sound, to generate a sound source direction value, where the function is a locating function, and is further, in an ideal state, a trigonometric locating function.

It may be understood that, two possible direction points may be determined by using intensity values and/or phase values generated by any two microphones; the two direction points are axially symmetric by using a straight line on which the two microphones are located as the axis; in addition, an intensity value and/or a phase value generated by one microphone is added to exclude the two possible direction points, to generate a unique sound direction.

The credibility module 46 is connected to the polling module 42, and configured to generate credibility corresponding to the thermal sensing value and the sound direction value according to a polling monitoring time division policy, wherein a sum of the credibility is 1.

It may be understood that, credibility of the thermal sensing value and the sound direction value is a weight value that may dynamically change. A longer time of polling corresponding to a module indicates higher credibility thereof.

The direction module 45 is further configured to generate a direction of the monitoring target according to the thermal sensing value, the sound direction value, and the credibility thereof. That is, an infrared pyroelectric signal and sound sent by the monitoring target are separately collected, and a collection result is analyzed and then weighted, to increase accuracy of identifying and locating a human body.

The infrared transceiver 47 is connected to the direction module 45, and configured to perform infrared detection on the specified direction.

The specified direction includes a sound direction, or a monitoring target direction that is generated according to a sound signal and an infrared signal.

The distance module 48 is connected to the infrared transceiver 47, and configured to determine a distance between the monitoring target and the infrared transceiver 50 according to an infrared detection result.

Specifically, the distance module 48 includes:

a time difference sub-module 481, configured to calculate a difference between an infrared transmitting time and an infrared receiving time, to generate an infrared detection result; and a distance sub-module 482, configured to determine a horizontal distance, a height difference, and/or a pitch angle between the monitoring target and the infrared transceiver according to the infrared detection result.

For example, the infrared transceiver performs infrared detection on an area range of the sound source direction, to generate multiple groups of infrared detection results, and determines an outline of the monitoring target according to the groups of infrared detection results. A relative distance between each edge of the outline of the monitoring target and the infrared transceiver is compared. For example, if the monitoring target is a person standing on the level ground, the relative distance may be represented as: a horizontal distance is 2 meters, and a height is 0 meters to 1.7 meters; if the monitoring target is a person lying on a bed, the relative distance may be represented as: a horizontal distance is 0.5 meter, and a height is 0.5 meter to 0.8 meter.

The location module 49 is connected to the direction module 45 and the distance module 48, and configured to generate the location information of the monitoring target according to the direction and the distance.

It may be understood that, in this step, the location information of the monitoring target refers to the relative location between the monitoring target and the terminal device. For example, a voice prompt is: the monitoring target is 20 meters to the front left of the terminal device, the monitoring target is 45 meters from the terminal device at an 11 o'clock direction, and so on; a video prompt is: a relative location relationship between the two is displayed in a map navigation manner, and a dynamic variation prompt for a route is provided as the two move closer or farther from each other.

It may be understood that, the location information that is of the monitoring target and that is generated by the location module 49 refers to the relative location between the monitoring target and the terminal device. For example, the monitoring target is 20 meters to the front left of the terminal device, the monitoring target is 45 meters from the terminal device at an 11 o'clock direction, and so on.

As another possible implementation, the locating system 400 includes: a thermal infrared sensing array 43, a microphone array 44, an infrared transceiver 47, a processor, and a memory (not shown in the figure).

The memory stores the request module 41, the polling module 42, the direction module 45, the credibility module 46, the distance module 48, and the location module 49 (not shown in the figure). Operations performed by the modules stored in the memory when the modules are performed by the processor are the same as those in the embodiment shown in FIG. 4. Details are not described herein again.

According to the locating system of this application, polling monitoring is performed by using a microphone array and/or a thermal infrared sensing array, to generate a direction of a monitoring target, infrared detection is performed on the direction by using an infrared transceiver, to generate a distance between the two, and location information of the monitoring target is generated according to the direction and the distance, thereby not only implementing multi-directional collection of a sound signal and an infrared pyroelectric signal, but also identifying, locating and confirming the monitoring target by using a time division scanning weighting algorithm.

Figure 5:
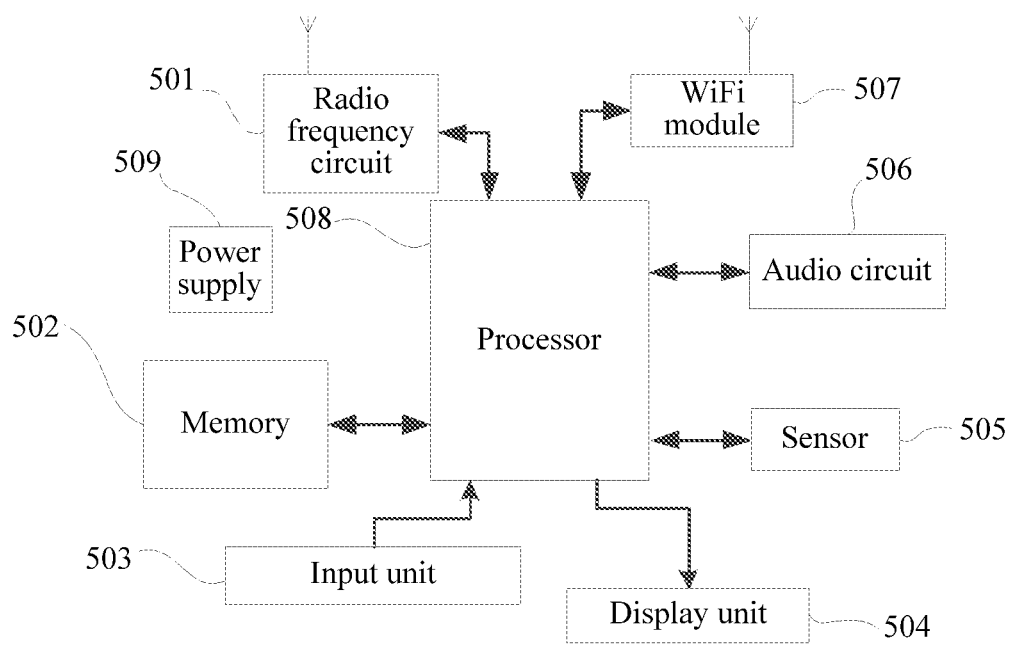
FIG. 5 is a schematic diagram of modules of a terminal device according to an embodiment of this application.

Correspondingly, an embodiment of this application further provides a terminal. As shown in FIG. 5, the terminal may include components such as a radio frequency (RF) circuit 501, a memory 502 including one or more computer readable storage media, an input unit 503, a display unit 504, a sensor 505, an audio circuit 506, a wireless fidelity (WiFi) module 507, a processor 508 including one or more processing cores, and a power supply 509. A person skilled in the art may understand that the structure of the terminal shown in FIG. 5 does not constitute a limitation to the terminal, and the terminal may include more components or fewer components than those shown in the figure, or some components may be combined, or a different component deployment may be used.

The sensor 505 includes, for example, a thermal infrared sensing array and an infrared transceiver. Specifically, the thermal infrared sensing array includes at least three thermal infrared receivers, and is configured to monitor the infrared pyroelectric signal sent by the monitoring target, to obtain a thermal sensing value. The infrared transceiver includes an infrared transmitting component and an infrared receiving component, and may calculate a distance between the monitoring target and the terminal according to an intensity difference and a time difference between received and sent infrared light. In addition, the infrared transceiver may further include a motion sensor, for example, a gravity acceleration sensor, which can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, and a thermometer, which may be configured in the terminal, are not further described herein.

The audio circuit 506, a speaker, and a microphone may provide audio interfaces between the user and the terminal. The audio circuit 506 may convert received audio data into an electric signal and transmit the electric signal to the speaker. The speaker converts the electric signal into a sound signal for output. On the other hand, the microphone, such as the microphone array, converts a collected sound signal into an electric signal. The audio circuit 506 receives the electric signal and converts the electric signal into audio data, and outputs the audio data to the processor 508 for processing. Then, the processor 580 sends the audio data to, for example, another terminal by using the RF circuit 501, or outputs the audio data to the memory 502 for further processing. The microphone array includes at least three microphones, which are evenly distributed at detecting head locations of a terminal device.

The processor 508 is a control center, such as a logic controller, of the terminal, which is connected to various parts of the entire mobile phone by using various interfaces and lines, and by running or executing a software program and/or module stored in the memory 502 and calling data stored in the memory 502, to perform various functions of the terminal and process data, so as to perform overall monitoring on the mobile phone. In some embodiments, the processor 508 may include one or more processing cores. In some embodiments, the processor 508 may integrate an application processor and a modem. The application processor mainly processes an operating system, a user interface, an application program, and the like. The modem mainly processes wireless communication. It may be understood that the foregoing modem may either not be integrated into the processor 508.

Specifically, in this embodiment, the processor 508 on the terminal may load, according to the following instructions, executable files corresponding to processes of one or more application programs into the memory 502. The processor 508 runs the application programs stored in the memory 502, to implement various functions described in the embodiments shown in FIG. 2 to FIG. 4.

According to the terminal device of this application, polling monitoring is performed by using a microphone array and/or a thermal infrared sensing array, to generate a direction of a monitoring target, infrared detection is performed on the direction by using an infrared transceiver, to generate a distance between the two, and location information of the monitoring target is generated according to the direction and the distance, thereby not only implementing multi-directional collection of a sound signal and an infrared pyroelectric signal, but also identifying, locating and confirming the monitoring target by using a time division scanning weighting algorithm.

The locating method, the locating system, and the terminal device provided in the embodiments of this application belong to a same concept. For details about a specific implementation process thereof, refer to the entirety of the specification. Details are not described herein again.

A person of ordinary skill in the art may understand that all or some of the processes of the methods in the embodiments may be implemented by a computer program instructing relevant hardware. The program may be stored in a computer-readable storage medium. When the program runs, the processes of the methods in the embodiments are performed. The foregoing storage medium may be: a magnetic disk, an optical disc, a read-only memory (ROM), a random access memory (RAM), or the like.

In conclusion, although this application discloses the embodiments as above, the above preferred embodiments are not intended to limit this application. Any modification, equivalent replacement, or improvement made by persons of ordinary skill in the art without departing from the spirit and scope of this application should fall within the scope of the present disclosure. Therefore, the protection scope of this application is subject to the appended claims.

What is claimed is:

1. A method, comprising:
at a device having one or more processors and memory, wherein the device is configured to control a location unit, wherein the location unit includes a microphone array including at least three microphones located at different positions in the microphone array, an infrared sensing array including at least three infrared sensors located at different positions in the infrared sensing array, and an infrared transceiver configured to emit an infrared signal and receive a reflected infrared signal:
monitoring, by using the microphone array, a sound generated by a monitoring target;
in response to detecting a sound signal by the microphone array, determining a sound source direction corresponding to detected sound signal according to a sound phase difference obtained by each microphone in the microphone array;
performing infrared detection in the sound source direction by using the infrared transceiver;
determining a distance between the monitoring target and the infrared transceiver in the sound source direction according to an infrared detection result obtained by the infrared transceiver; and
generating location information of the monitoring target according to the sound source direction and the distance.

2. The method according to claim 1, including:
before performing the monitoring, by using the microphone array, a sound generated by a monitoring target:
receiving a locating request;
in response to receiving the locating request, invoking the microphone array and the thermal infrared sensing array according to a time division polling policy to alternately monitor the monitoring target using only one of the microphone array and the thermal infrared sensing array at a time, including:

monitoring an infrared pyroelectric signal of the monitoring target by using the thermal infrared sensing array;

in accordance with a determination that an infrared pyroelectric signal is detected by the thermal infrared sensing array, invoking the microphone array to monitor a sound generated by a monitoring target; and in accordance with a determination that an infrared pyroelectric signal is not detected within a time period set for the infrared sensing array in the time division polling policy, and that the time period set for the infrared sensing array has expired, invoking the microphone array to monitor a sound generated by a monitoring target.

3. The method according to claim 2, including:

detecting, by using the thermal infrared sensing array, an infrared sensing value of an infrared pyroelectric signal emitted by the monitoring target;

calculating a sound intensity difference and/or a sound phase difference received by each microphone in the microphone array, to obtain a sound direction value corresponding to the monitoring target;

separately obtaining credibility values corresponding to the thermal sensing value and the sound direction value according to the time division polling policy, wherein a sum of the credibility values is constrained to be unity; and determining the sound source direction according to the thermal sensing value, the sound direction value, and the corresponding credibility values thereof.

4. The method according to claim 3, wherein calculating a sound intensity difference and/or a sound phase difference received by each microphone in the microphone array, to obtain a sound direction value corresponding to the monitoring target includes:

simultaneously performing sound monitoring on each microphone of the microphone array to obtaining a respective sound intensity value and/or a respective sound phase value for the microphone; and performing difference calculation by substituting the sound intensity value and/or sound phase value of each sound into a triangulation locating function, to obtain the sound direction value according to a calculation result.

5. The method according to claim 1, including:

in accordance with a determination that a sound signal is detected by the microphone array, performing a voice or semantic analysis on the sound signal; and determining, according to an analysis result of the voice or semantic analysis, whether a wake-up keyword is included in the sound signal, wherein determination of the sound source direction corresponding to the detected sound signal according to the sound phase difference obtained by each microphone in the microphone array is performed in accordance with a determination that a wake-up keyword is included in the sound signal.

6. The method according to claim 1, wherein the determining a distance between the monitoring target and the infrared transceiver in the sound source direction according to the infrared detection result include:

calculating a difference between an infrared transmitting time stamp and a corresponding infrared receiving time stamp, to generate the infrared detection result; and determining a horizontal distance, a height difference, and/or a pitch angle between the monitoring target and the infrared transceiver according to the infrared detection result.

7. The method according to claim 6, including:

moving the location unit in accordance with a comparison between a preset distance and the distance between the monitoring target and the infrared transceiver in the sound source direction.

8. A device, comprising:

one or more processors;

memory, wherein:

the device is configured to control a location unit, the location unit includes a microphone array including at least three microphones located at different positions in the microphone array, an infrared sensing array including at least three infrared sensors located at different positions in the infrared sensing array, and an infrared transceiver configured to emit an infrared signal and receive a reflected infrared signal, and the memory stores a plurality of instructions that, when executed by the one or more processors, cause the one or more processors to perform the following operations:

monitoring, by using the microphone array, a sound generated by a monitoring target;

in response to detecting a sound signal by the microphone array, determining a sound source direction corresponding to detected sound signal according to a sound phase difference obtained by each microphone in the microphone array;

performing infrared detection in the sound source direction by using the infrared transceiver;

determining a distance between the monitoring target and the infrared transceiver in the sound source direction according to an infrared detection result obtained by the infrared transceiver; and generating location information of the monitoring target according to the sound source direction and the distance.

9. The device according to claim 8, wherein the operations include:

before performing the monitoring, by using the microphone array, a sound generated by a monitoring target:

receiving a locating request;

in response to receiving the locating request, invoking the microphone array and the thermal infrared sensing array according to a time division polling policy to alternately monitor the monitoring target using only one of the microphone array and the thermal infrared sensing array at a time, including:

monitoring an infrared pyroelectric signal of the monitoring target by using the thermal infrared sensing array;

in accordance with a determination that an infrared pyroelectric signal is detected by the thermal infrared sensing array, invoking the microphone array to monitor a sound generated by a monitoring target; and in accordance with a determination that an infrared pyroelectric signal is not detected within a time period set for the infrared sensing array in the time division polling policy, and that the time period set for the infrared sensing array has expired, invoking the microphone array to monitor a sound generated by a monitoring target.

10. The device according to claim 9, wherein the operations include:
detecting, by using the thermal infrared sensing array, an infrared sensing value of an infrared pyroelectric signal emitted by the monitoring target;
calculating a sound intensity difference and/or a sound phase difference received by each microphone in the microphone array, to obtain a sound direction value corresponding to the monitoring target;
separately obtaining credibility values corresponding to the thermal sensing value and the sound direction value according to the time division polling policy, wherein a sum of the credibility values is constrained to be unity; and
determining the sound source direction according to the thermal sensing value, the sound direction value, and the corresponding credibility values thereof.

11. The device according to claim 10, wherein calculating a sound intensity difference and/or a sound phase difference received by each microphone in the microphone array, to obtain a sound direction value corresponding to the monitoring target includes:
simultaneously performing sound monitoring on each microphone of the microphone array to obtaining a respective sound intensity value and/or a respective sound phase value for the microphone; and
performing difference calculation by substituting the sound intensity value and/or sound phase value of each sound into a triangulation locating function, to obtain the sound direction value according to a calculation result.

12. The device according to claim 8, wherein the operations include:
in accordance with a determination that a sound signal is detected by the microphone array, performing a voice or semantic analysis on the sound signal; and
determining, according to an analysis result of the voice or semantic analysis, whether a wake-up keyword is included in the sound signal, wherein determination of the sound source direction corresponding to the detected sound signal according to the sound phase difference obtained by each microphone in the microphone array is performed in accordance with a determination that a wake-up keyword is included in the sound signal.

13. The device according to claim 8, wherein the determining a distance between the monitoring target and the infrared transceiver in the sound source direction according to the infrared detection result include:
calculating a difference between an infrared transmitting time stamp and a corresponding infrared receiving time stamp, to generate the infrared detection result; and
determining a horizontal distance, a height difference, and/or a pitch angle between the monitoring target and the infrared transceiver according to the infrared detection result.

14. The device according to claim 13, wherein the operations include:
moving the location unit in accordance with a comparison between a preset distance and the distance between the monitoring target and the infrared transceiver in the sound source direction.

15. A non-transitory computer-readable storage medium storing a plurality of instructions configured for execution by a device having one or more processors, wherein:

the device is configured to control a location unit, the location unit includes a microphone array including at least three microphones located at different positions in the microphone array, an infrared sensing array including at least three infrared sensors located at different positions in the infrared sensing array, and an infrared transceiver configured to emit an infrared signal and receive a reflected infrared signal, and
the plurality of instructions cause the device to perform the following operations:
monitoring, by using the microphone array, a sound generated by a monitoring target;
in response to detecting a sound signal by the microphone array, determining a sound source direction corresponding to detected sound signal according to a sound phase difference obtained by each microphone in the microphone array;
performing infrared detection in the sound source direction by using the infrared transceiver;
determining a distance between the monitoring target and the infrared transceiver in the sound source direction according to an infrared detection result obtained by the infrared transceiver; and
generating location information of the monitoring target according to the sound source direction and the distance.

16. The non-transitory computer-readable storage medium according to claim 15, wherein the operations include:
before performing the monitoring, by using the microphone array, a sound generated by a monitoring target:
receiving a locating request;
in response to receiving the locating request, invoking the microphone array and the thermal infrared sensing array according to a time division polling policy to alternately monitor the monitoring target using only one of the microphone array and the thermal infrared sensing array at a time, including:
monitoring an infrared pyroelectric signal of the monitoring target by using the thermal infrared sensing array;
in accordance with a determination that an infrared pyroelectric signal is detected by the thermal infrared sensing array, invoking the microphone array to monitor a sound generated by a monitoring target; and
in accordance with a determination that an infrared pyroelectric signal is not detected within a time period set for the infrared sensing array in the time division polling policy, and that the time period set for the infrared sensing array has expired, invoking the microphone array to monitor a sound generated by a monitoring target.

17. The non-transitory computer-readable storage medium according to claim 16, wherein the operations include:
detecting, by using the thermal infrared sensing array, an infrared sensing value of an infrared pyroelectric signal emitted by the monitoring target;
calculating a sound intensity difference and/or a sound phase difference received by each microphone in the microphone array, to obtain a sound direction value corresponding to the monitoring target;
separately obtaining credibility values corresponding to the thermal sensing value and the sound direction value according to the time division polling policy, wherein a sum of the credibility values is constrained to be unity; and determining the sound source direction according to the thermal sensing value, the sound direction value, and the corresponding credibility values thereof.

18. The non-transitory computer-readable storage medium according to claim 17, wherein calculating a sound intensity difference and/or a sound phase difference received by each microphone in the microphone array, to obtain a sound direction value corresponding to the monitoring target includes:

simultaneously performing sound monitoring on each microphone of the microphone array to obtaining a respective sound intensity value and/or a respective sound phase value for the microphone; and performing difference calculation by substituting the sound intensity value and/or sound phase value of each sound into a triangulation locating function, to obtain the sound direction value according to a calculation result.

19. The non-transitory computer-readable storage medium according to claim 15, wherein the operations include:

in accordance with a determination that a sound signal is detected by the microphone array, performing a voice or semantic analysis on the sound signal; and determining, according to an analysis result of the voice or semantic analysis, whether a wake-up keyword is included in the sound signal, wherein determination of the sound source direction corresponding to the detected sound signal according to the sound phase difference obtained by each microphone in the microphone array is performed in accordance with a determination that a wake-up keyword is included in the sound signal.

20. The non-transitory computer-readable storage medium according to claim 19, wherein the determining a distance between the monitoring target and the infrared transceiver in the sound source direction according to the infrared detection result include:

calculating a difference between an infrared transmitting time stamp and a corresponding infrared receiving time stamp, to generate the infrared detection result; and determining a horizontal distance, a height difference, and/or a pitch angle between the monitoring target and the infrared transceiver according to the infrared detection result.

* * * * *